United States Patent
Chang

(10) Patent No.: US 7,367,062 B2
(45) Date of Patent: Apr. 29, 2008

(54) METHOD FOR BIOS SECURITY OF COMPUTER SYSTEM

(75) Inventor: Jeom-jin Chang, Suwon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 643 days.

(21) Appl. No.: 10/603,746

(22) Filed: Jun. 26, 2003

(65) Prior Publication Data

US 2004/0111633 A1 Jun. 10, 2004

(30) Foreign Application Priority Data

Dec. 4, 2002 (KR) .................. 10-2002-0076598

(51) Int. Cl.
G06F 21/00 (2006.01)
G06F 7/04 (2006.01)
G06K 9/00 (2006.01)

(52) U.S. Cl. .................. 726/28; 713/1; 713/193; 713/2; 714/36

(58) Field of Classification Search ............. 726/28; 713/36

See application file for complete search history.

(56) References Cited

U.S. PATENT DOCUMENTS

| 5,852,736 A | 12/1998 | Shipman et al. | |
| 6,308,265 B1 | 10/2001 | Miller | |
| 6,748,544 B1* | 6/2004 | Challener et al. | 726/17 |
| 6,892,323 B2* | 5/2005 | Lin | 714/36 |
| 2002/0120845 A1* | 8/2002 | Cromer et al. | 713/168 |
| 2004/0003265 A1* | 1/2004 | Freeman et al. | 713/191 |

FOREIGN PATENT DOCUMENTS

| CN | 401562 | 8/2000 |
| CN | 480443 | 3/2002 |
| JP | 11-110210 | 4/1999 |
| JP | 2001-084049 | 3/2001 |
| JP | 2001-222421 | 8/2001 |
| JP | 2002-007214 | 1/2002 |
| JP | 2002-055725 | 2/2002 |
| KR | 10-0299119 | 6/2001 |
| KR | 10-0299954 | 6/2001 |

* cited by examiner

Primary Examiner—Gilberto Barron, Jr.
Assistant Examiner—Aubrey H Wyszynski
(74) Attorney, Agent, or Firm—Staas & Halsey LLP

(57) ABSTRACT

A method of maintaining security of a BIOS included in a BIOS ROM of a computer system. The method of BIOS security of the computer system includes storing a check sum value calculated by byte-adding a user password and a product serial number of a BIOS ROM. The method further includes comparing the stored check sum value with a check sum value calculated by byte-adding an inputted password and the product serial number of the BIOS ROM. The method further includes enabling writing to the BIOS ROM when the stored check sum value and the calculated check sum value are equal. Thus, by adding a checking function to check the product serial number given by manufacturer and the director password given by a user, the BIOS ROM is effectively protected from an optional or malicious falsification, change, or removal action.

14 Claims, 3 Drawing Sheets

METHOD FOR BIOS SECURITY OF COMPUTER SYSTEM

CROSS-REFERENCE TO RELATED APPLICATIONS

This application claims the benefit of Korean Patent Application No. 2002-0076598, filed Dec. 4, 2002, in the Korean Intellectual Property Office, the disclosure of which is incorporated herein by reference.

BACKGROUND OF THE INVENTION

1. Field of the Invention

The present invention relates to a computer system, and more particularly to a method of maintaining security of a BIOS included in a BIOS ROM of a computer system.

2. Description of the Related Art

A BIOS (Basic Input Output System) of a computer system plays an important role in confirming initialization and error of the computer system by a POST (Power On Self Test) using a CMOS (Complementary Metal Oxide Semiconductor) Setup value, and performing a Run-time function after operating an OS (Operating System) of the computer system.

FIG. 3 illustrates a conventional structure of security maintenance of a BIOS ROM (Read Only Memory) implemented in hardware in a computer system. A north bridge chip 20 to control video and memory, and a south bridge chip 30 to control various peripheral devices in the computer system are both connected to a CPU 10 via a bus structure. In the conventional system, a BIOS ROM 50 on which the BIOS is stored includes a rewritable Flash-ROM and is connected to the south bridge chip 30 via a LPC (Low Pin Count) bus. An SIO (Super Input/Output) chip 40, which is an input/output device of a Legacy Port, an FDD or the like, is connected to the south bridge chip 30 via the LPC bus.

To prevent writing to the BIOS ROM 50, one of the GPIO (General Purpose Input/Output) pins of a chipset having a GPIO function can be set up as a BIOS writing protection (BIOSWP#) pin. In FIG. 3, a GPIO pin 41 provided in the SIO chip 40 is set up as the BIOSWP#. A CS (chip select) signal for selecting an input part 51 of a flash region of the BIOS ROM 50 is outputted therefrom. According to high/low signal outputted from the BIOSWP# pin, writing operation in the flash region of the BIOS ROM 50 is enabled or disabled. The writing operation of the BIOS ROM 50 may be performed by setting up one of the GPIO pins provided in the south bridge chip 30 as the BIOSWP# pin.

Thus, if the BIOSWP# pin is set up as enabled with the POST being performed by the BIOS, elimination or writing to the flash region of the BIOS ROM can be prevented. Also, in a case of recording an ESCD (Extended System Configuration Data) region of the BIOS ROM, or in a case of updating the BIOS, the BIOSWP# pin is set up as disabled by using a PNP NVRAM (Plug and Play Non-volatile Random Access Memory) manager, to thereby enable writing to the flash region of the BIOS ROM.

However, in a case that location of the BIOSWP# pin on the SIO chip or the south bridge chip is disclosed, or in a case that a memory-mapped IO address assigned as an IO (Input/Output) trap region and a control method such as a GPIO pin set-up method are disclosed, there is a security problem that a function of the BIOSWP# pin is optionally set up as disabled and thus content of the BIOS ROM is changed or removed. Therefore, in a case that the BIOS is changed by a virulent virus owing to carelessness in security for the BIOS in the computer system, fatal damage to the computer system can occur, for example booting of the computer system may be disabled or the function thereof is not performed. In fact, there have been instances where a user's system was badly damaged by a CIH (Chernobyl) virus that removed the content of the BIOS ROM.

SUMMARY OF THE INVENTION

Accordingly, it is an aspect of the present invention to provide a method to enable security of a BIOS to be maintained by protecting the BIOS from being changed or removed virulently or optionally by using a serial number, that is a typical characteristic of a product, given by a manufacturer and a director password given by a user, in a case of changing content of the BIOS ROM in a computer system.

Additional aspects and advantages of the present invention will be set forth in part in the description that follows and, in part, will be obvious form the description, or may be learned by practicing of the present invention.

The foregoing and/or other aspects of the present invention are achieved by providing a method for improving BIOS security of a computer system, comprising storing a check sum value calculated by byte-adding a user password and a product serial number of a BIOS ROM; comparing the stored check sum value with a check sum value calculated by byte-adding an inputted password and the product serial number of the BIOS ROM; and enabling writing to the BIOS ROM when the stored check sum value and the calculated check sum value are equal.

In an aspect, the storing the check sum value comprises determining if the user password is set up on a POST; determining the product serial number of the BIOS ROM in a case that the user password is set up; and storing an added check sum value that is calculated by byte-adding the user password and the product serial number in a memory, when the product serial number is not a default value in manufacturing.

In an aspect, the method for improving BIOS security further comprises setting up a memory-mapped input/output region assigned as a BIOS writing protection region of a chipset having a GPIO function as an input/output trap region and enabling an input/output trap.

In an aspect, the storing the added check sum value in the memory comprises storing the added check sum value in a CMOS RAM or a PNP NVRAM.

In an aspect, the method for improving BIOS security, further comprises setting up a memory-mapped input/output region assigned as a BIOS writing protection region of a chipset having a GPIO function as an input/output trap region and enabling an input/output trap; allowing an event disabling a BIOS writing protection during operation of the computer system to occur; setting up the input/output trap as disabled; determining the product serial number of the BIOS ROM; allowing a user to input the inputted password when the product serial number is not a default value in manufacturing; and calculating a check sum value by byte-adding the inputted password and the product serial number.

In an aspect, the method for improving BIOS security, further comprises enabling the input/output trap after enabling writing to the BIOS ROM.

In an aspect, the method for improving BIOS security, further comprises displaying an error message when the product serial number is a default value in manufacturing, or when the check sum values are not equal.

In an aspect, the allowing the event disabling the BIOS writing protection to occur comprises allowing the input/output trap to occur, or allowing writing to the BIOS ROM by a PNP NVRAM manager to occur.

In an aspect, the method for improving BIOS security, further comprises determining if the input/output trap is set up as enabled, when the writing to the BIOS ROM by the PNP NVRAM manager occurs.

In an aspect, the method for improving BIOS security, further comprises displaying an error message when the input/output trap is determined not to be set up as enabled when the writing to the BIOS ROM by the PNP NVRAM manager occurs.

In an aspect, the method for improving BIOS security, further comprises enabling the input/output trap after displaying the error message.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
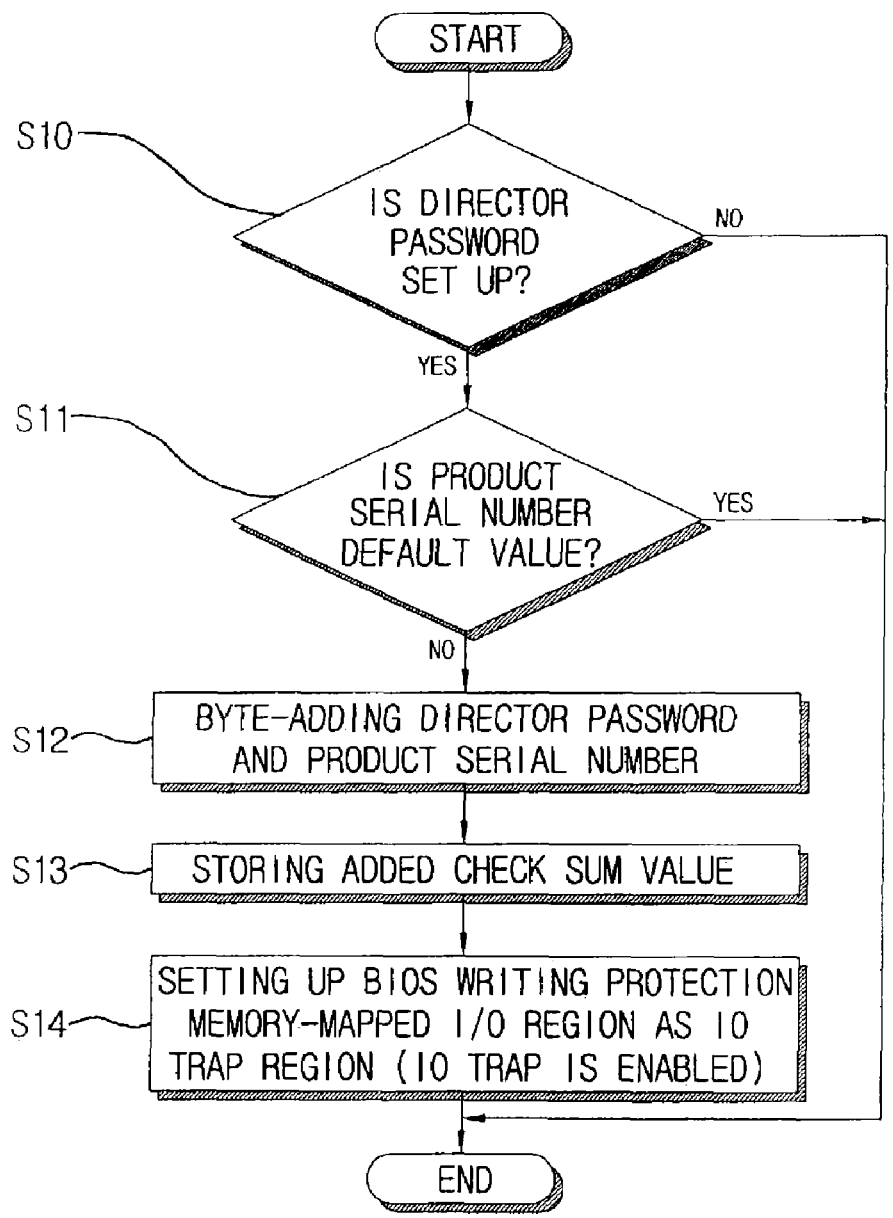
FIG. 1 is a flow diagram illustrating a process for setting up security of a BIOS ROM in a POST process according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 3:
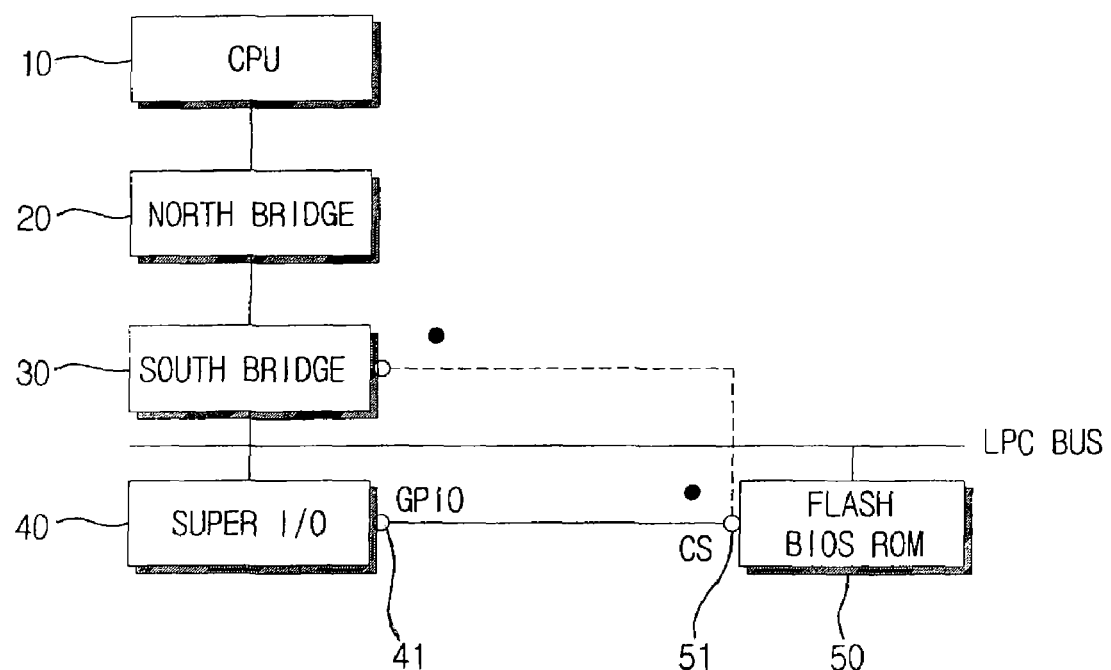
FIG. 3 is a block diagram illustrating security maintenance of a BIOS ROM of a conventional computer system.

According to the present invention, as shown in FIG. 3, there is provided a method to effectively protect data in a BIOS ROM, while not changing a security maintenance structure of the BIOS ROM in a hardware way in a computer system. That is, a check sum value calculated by byte-adding a director password set up by a user in a POST process and a predetermined product serial number read in an ESCD region of the BIOS ROM are previously stored in a memory place of a CMOS RAM (not shown) or a PNP NVRAM region. When writing to a flash region of a BIOS ROM 50 is tried on operation of a system, a check sum value calculated by byte-adding a password inputted by a user and the product serial number is compared with a previously stored check sum value. Accordingly, in a case that the compared two check sum values are equal, a BIOS writing protection (BIOSWP#) pin provided in a south bridge chip 30 or a SIO chip 40 is disabled, so that a signal (CS signal) to allow writing is given to a CS signal input part 51 of the flash region of the BIOS ROM 50, to thereby enable removal or writing to the flash region of the BIOS ROM.

FIG. 1 is a flow diagram illustrating a process for setting up security of a BIOS ROM in a POST process according to an embodiment of the present invention. As shown in FIG. 1, it is determined through a POST process by a BIOS whether the password is set up by a user (S10). The password can be previously set up in a CMOS set-up process by a user. Also, in a case that the password is not set up in the determining process, the password may be set up again according to selection of a user, or a set-up process of security processes may be omitted. In a case that the user password is set up, it is confirmed whether the product serial number read in the ESCD region of the BIOS ROM 50 is a default value in a manufacturing process (S11). In a case that the BIOS ROM 50 is produced through a normal manufacturing process, a predetermined product serial number, not a default value in a manufacturing process, can be confirmed. In a case that the BIOS ROM 50 is not produced through a normal manufacturing process, the product serial number has a default value and thus the set-up process of the security process can be omitted in order to protect the BIOS ROM 50.

If the BIOS ROM 50 has a predetermined product serial number, not a default value, and thus is confirmed as the normal manufacturing product, the check sum value calculated by byte-adding the director password set up by a user and the product serial number is stored in a predetermined memory (S12, S13). Herein, it is preferable that the check sum value is stored in the CMOS RAM or the NVRAM. Thus, a memory-mapped input/output region (I/O region) corresponding to a BIOSWP# pin region in a chipset having GPIO function like the SIO chip 40 or the south bridge chip 30 is set up as an IO (Input/Output) trap region (as illustrated in FIG. 3), and then the IO trap is to be set up as enabled (S14).

Like this, a process for setting up the security of the BIOS ROM is ended by previously storing the check sum value on the basis of the product serial number of the BIOS ROM and the user password.

Figure 2:
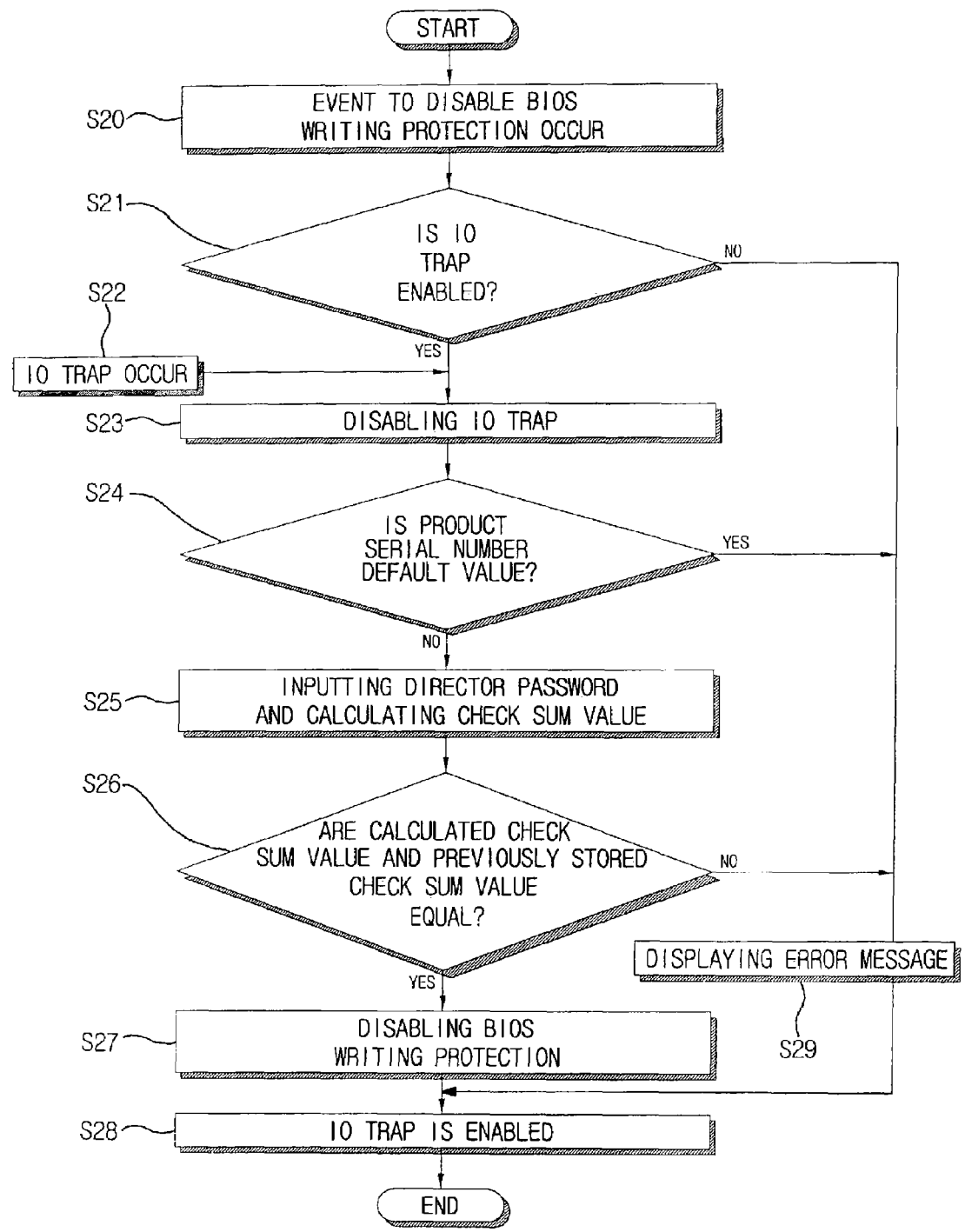
FIG. 2 is a flow diagram illustrating a process for maintaining the security of the BIOS ROM during operation of a system on the basis of FIG. 1.

FIG. 2 illustrates a process to maintain the security of the BIOS ROM, in a case that an event to disable a BIOS writing protection of the BIOS ROM occurs on operation of a system.

To disable the BIOS writing protection of the BIOS ROM during operation of a system, in a case that a ROM BIOS region is to be changed through a PNP NVRAM manager (S20), or in a case that the IO trap occurs by access to the memory-mapped IO region corresponding to a BIOS writing protection pin 41 to be processed through an IO trap processing unit (S22), the security of the BIOS ROM is maintained by the following process.

At first, in a case that the ROM BIOS region is to be changed by the PNP NVRAM manager, the IO trap is determined to be enabled or not (S21). Herein, if the IO trap is confirmed as not enabled, an error message is displayed (S29) and the IO trap is to be enabled again (S28). In a case that in S21, the IO trap is confirmed as enabled or in a case that occurrence of the IO trap by the IO trap processing unit is confirmed (S22), the IO trap is to be disabled (S23) in order to prevent an additional SMI (System Management Interrupt) from occurring.

The, product serial number is checked to determine whether the BIOS ROM 50 is the normal manufacturing product (S24). If the product serial number is a default value in a manufacturing process, the BIOS ROM 50 is not the normal manufacturing product, so that an error message is outputted in order to protect the BIOS ROM 50 (S29), not to thereby disable the BIOS writing protection pin 41. However, if the product serial number is not the default value in the manufacturing process, the BIOS ROM 50 is the normal manufacturing product, so that a password input window is displayed to allow a user to input a director password thereto (S25).

Accordingly, a check sum is calculated by byte-adding the inputted director password and the product serial number (S25). By comparing the calculated check sum value with a previously stored check sum value in the POST process (S26), in a case that the two check sum values are equal, the BIOS writing protection pin 41 is set up as disabled (S27), to thereby enable access to the flash region of the BIOS ROM 50. However, in a case that the calculated check sum value is not equal to the previously stored check sum value, for example owing to erroneous input of the password, an error message is outputted (S29) and the BIOSWP# pin 41 is maintained as enabled in order to protect the region of ROM BIOS. Accordingly, data necessary for setting up a system can be recorded in the BIOS ROM 50. After the above process, the IO trap of the IO region assigned as a memory map corresponding to region of the BIOSWP# pin in the south bridge chip 30 and the SIO chip 40 is enabled again (S28), to provide against additional SMI occurrence.

Like this, according to a method to maintain the security of the BIOS of the present invention, during an operation of a program, in a case that there is an access to a memory-mapped IO region assigned as an IO trap region corresponding to region of the BIOS writing protection pin, or in a case that the region of the ROM BIOS is to be changed through the PNP NVRAM manager, an access to the BIOS ROM is enabled only when the check sum value calculated by byte-adding the product serial number and the user password is equal to the previously stored check sum value, to thereby enable the BIOS writing protection pin to be disabled. If the two check sum values are not equal, setting up the BIOS writing protection pin as disabled is impossible, to thereby enable the BIOS ROM to be protected.

Therefore, with the configuration according to the present invention, even if location of the BIOSWP# pin, a memory-mapped IO address, and a control method such as a GPIO pin set-up method in the SIO chip or the south bridge chip having the GPIO function are disclosed, the BIOS ROM can be protected from optionally changing or removing its content. Also, even if the ESCD region of the BIOS ROM is recorded, or even if update of the BIOS is needed, the BIOSWP# pin can be set up as disabled by using the PNP NVRAM manager, so that writing to the flash region of the BIOS ROM can be performed. Accordingly, by reinforcing the security of the BIOS in the computer system, a fatal damage on the computer system due to a virulent virus, such as booting of the computer system is disabled or the function thereof is not performed in its own way, can be prevented. In addition, an update to improve efficiency of the BIOS ROM can be performed safely.

Like this, according to the present invention, a hardware structure to protect the BIOS ROM by using one of the GPIO pins of the south bridge chip or the SIO chip as the BIOSWP# pin is used. Herein, by adding a checking function to check the product serial number given by manufacturer and the director password given by a user, the BIOS ROM is effectively protected from an optional or malicious falsification, change, or removal action.

According to the present invention as described above, security of a BIOS can be maintained by protecting the BIOS on a BIOS ROM from being changed or removed virulently or optionally with typical product serial number of the BIOS ROM given by a manufacturer and with a password given by a user.

The hardware included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Although a few embodiments of the present invention have been shown and described, it will be appreciated by those skilled in the art that changes may be made in these embodiments without departing from the principles and spirit of the present invention, the scope of which is defined in the appended claims and their equivalents.

What is claimed is:

1. A method of improving BIOS (Basic Input Output System) security of a computer system, comprising:
   checking for a default value in manufacturing of a product serial number of a BIOS ROM (Read Only Memory);
   storing a check sum value calculated by byte-adding a user password and the product serial number of the BIOS ROM (Read Only Memory) comprising storing an added check sum value that is calculated by byte-adding the user password and the product serial number in a memory, when the product serial number is not the default value in manufacturing;
   comparing the stored check sum value with a check sum value calculated by byte-adding an inputted password and the product serial number of the BIOS ROM; and
   enabling writing to the BIOS ROM when the stored check sum value and the calculated check sum value are equal.

2. The method of improving BIOS security according to claim 1, wherein the storing the check sum value comprises:
   determining if the user password is set up on a POST (Power On Self Test); and
   determining the product serial number of the BIOS ROM in a case that the user password is set up.

3. The method of improving BIOS security according to claim 2, further comprising:
   setting up a memory-mapped input/output region assigned as a BIOS writing protection region of a chipset having a GPIO (General Purpose Input Output) function as an input/output trap region and enabling an input/output trap.

4. The method of improving BIOS security according to claim 2, wherein the storing the added check sum value in the memory comprises:
   storing the added check sum value in a CMOS (Complementary Metal Oxide Semiconductor) RAM (Random Access Memory) or a PNP NVRAM (Plug And Play Non-Volatile Random Access Memory).

5. The method of improving BIOS security according to claim 1, further comprising:
   setting up a memory-mapped input/output region assigned as a BIOS writing protection region of a chipset having a GPIO (General Purpose Input Output) function as an input/output trap region and enabling an input/output trap;
   allowing an event disabling a BIOS writing protection during operation of the computer system to occur;
   setting up the input/output trap as disabled;

determining the product serial number of the BIOS ROM;
allowing a user to input the inputted password when the product serial number is not the default value in manufacturing; and
calculating a check sum value by byte-adding the inputted password and the product serial number.

6. The method of improving BIOS security according to claim 5, further comprising:
enabling the input/output trap after enabling writing to the BIOS ROM.

7. The method of improving BIOS security according to claim 5, further comprising:
displaying an error message when the product serial number is the default value in manufacturing, or when the check sum values are not equal.

8. The method of improving BIOS security according to claim 7, further comprising:
enabling the input/output trap after displaying the error message.

9. The method of improving BIOS security according to claim 5, wherein the allowing of the event disabling of the BIOS writing protection to occur comprises allowing the input/output trap to occur, or allowing writing to the BIOS ROM by a PNP NVRAM (Plug And Play Non-Volatile Random Access Memory) manager to occur.

10. The method of improving BIOS security according to claim 9, further comprising:
determining if the input/output trap is set up as enabled when the writing to the BIOS ROM by the PNP NVRAM manager occurs.

11. The method of improving BIOS security according to claim 10, further comprising:
displaying an error message when the input/output trap is determined not to be set up as enabled when the writing to the BIOS ROM by the PNP NVRAM manager occurs.

12. The method of improving BIOS security according to claim 11, further comprising:
enabling the input/output trap after displaying the error message.

13. A machine-readable medium that provides instructions, which, when executed by a machine, cause the machine to perform operations of improving BIOS (Basic Input Output System) security of a computer system comprising:
checking for a default value in manufacturing of a product serial number of a BIOS ROM (Read Only Memory);
storing a check sum value calculated by byte-adding a user password and the product serial number of the BIOS ROM (Read Only Memory);
comparing the stored check sum value with a check sum value calculated by byte-adding an inputted password and the product serial number of the BIOS ROM; and
enabling writing to the BIOS ROM when the stored check sum value and the calculated check sum value are equal, and the product serial number of the BIOS is not the default value.

14. A method of improving BIOS (Basic Input Output System) security of a computer system, comprising:
checking for a default value in manufacturing of a product serial number of a BIOS ROM (Read Only Memory);
receiving an inputted password; and
enabling writing to the BIOS ROM, having a security maintenance structure, when a stored check sum value and a calculated check sum value calculated by byte-adding the inputted password and the product serial number of the BIOS ROM are equal, and the product serial number of the BIOS is not the default value,
wherein the security maintenance structure of the BIOS ROM is not changed.

* * * * *